Aug. 30, 1938.  P. M. HENKES  2,128,611
ENGRAVING AND ALLIED MACHINE
Filed July 27, 1935    5 Sheets-Sheet 5
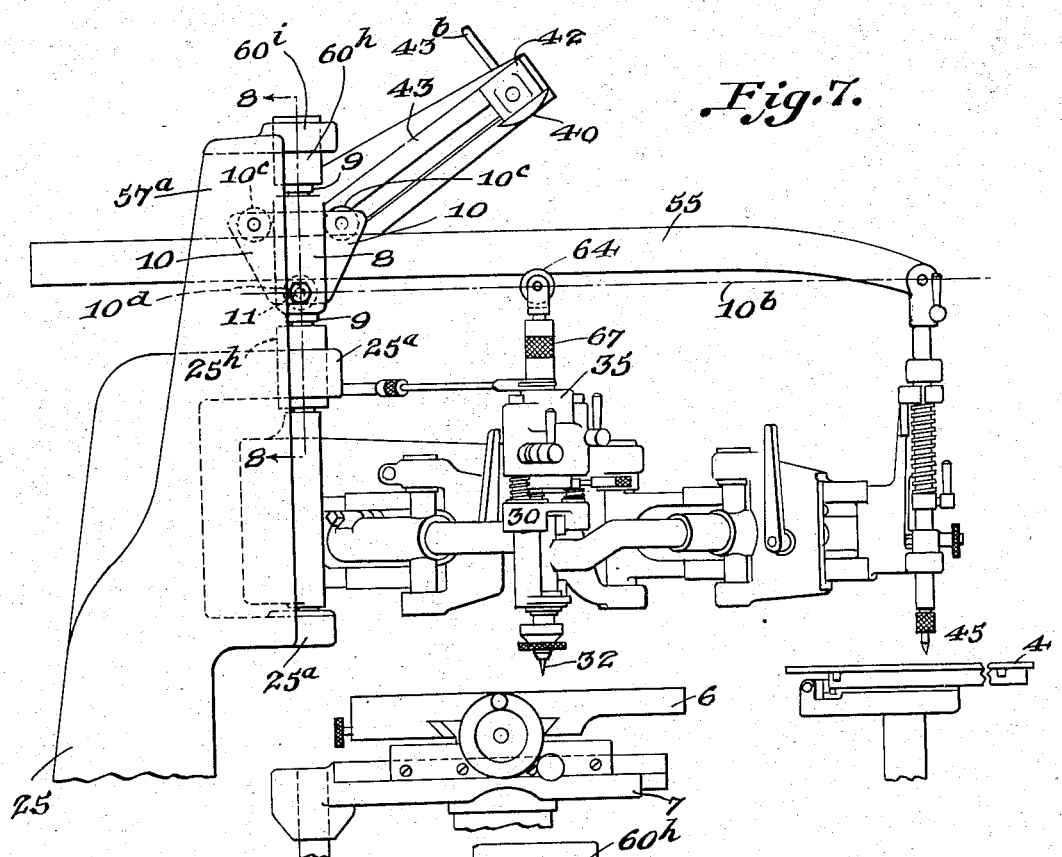
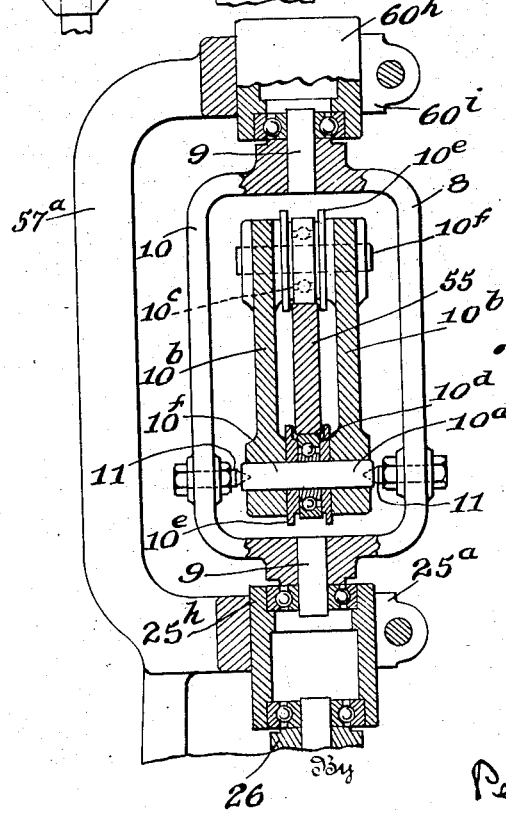
Inventor
P. M. Henkes
By Peck & Peck  Attorneys Patented Aug. 30, 1938

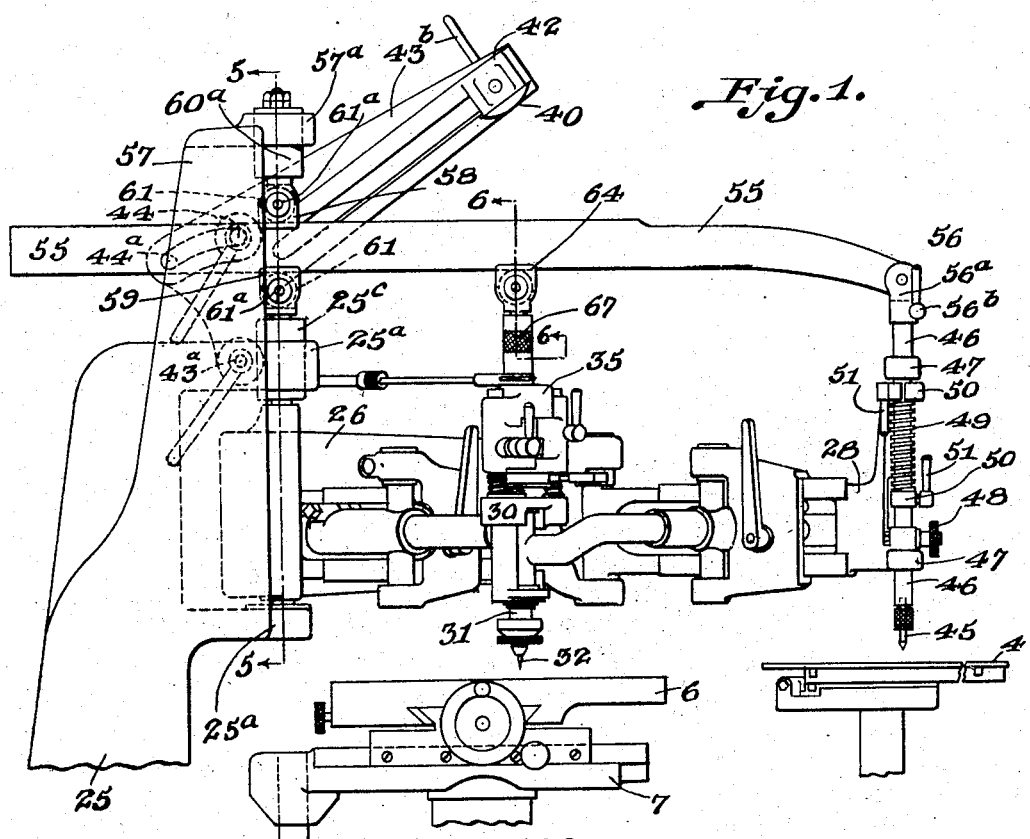
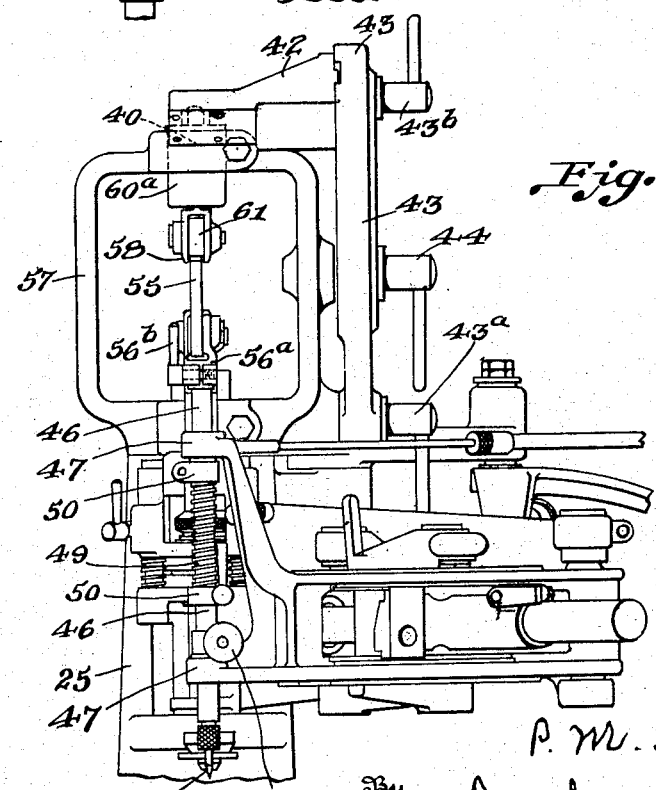

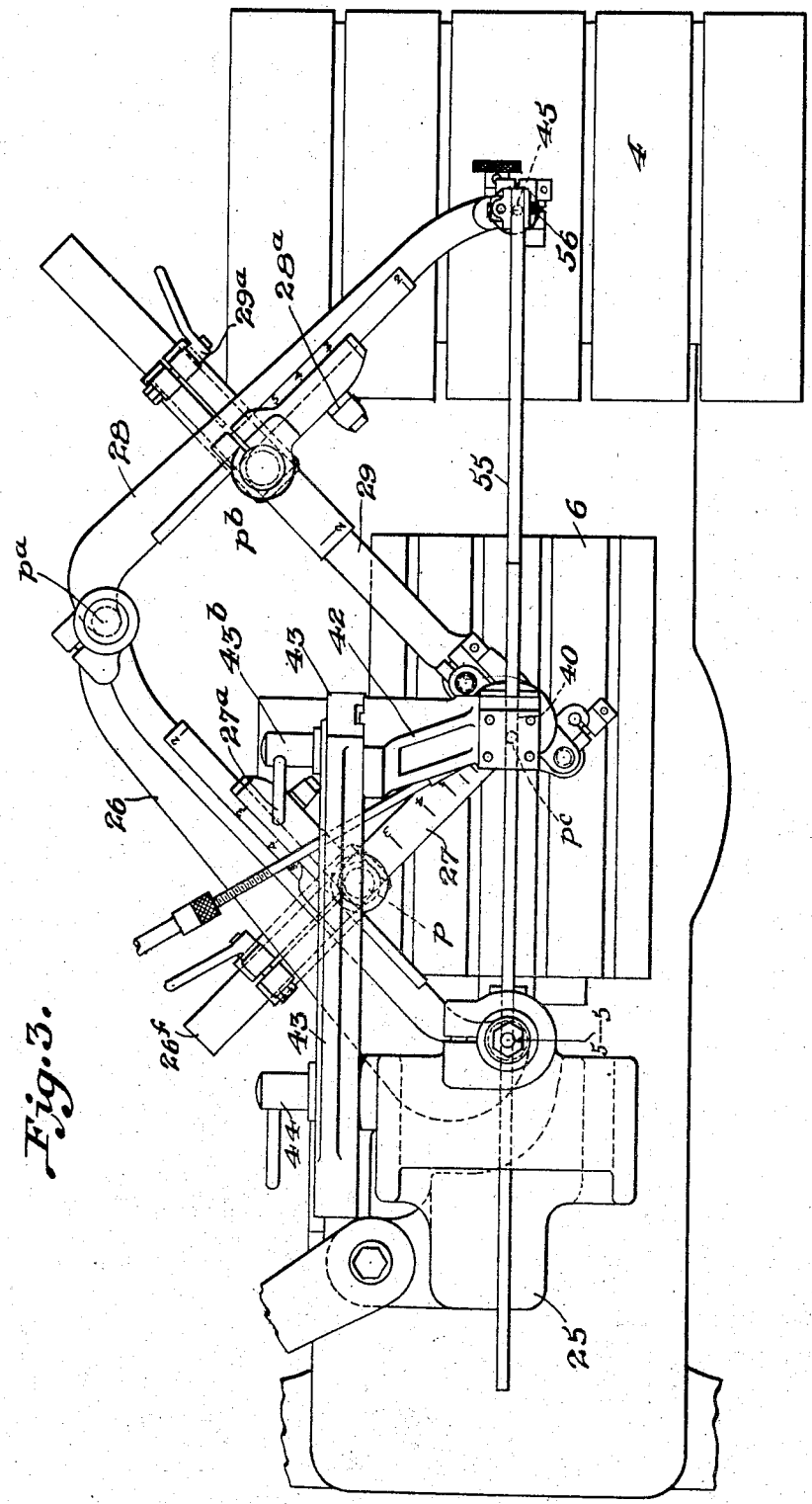

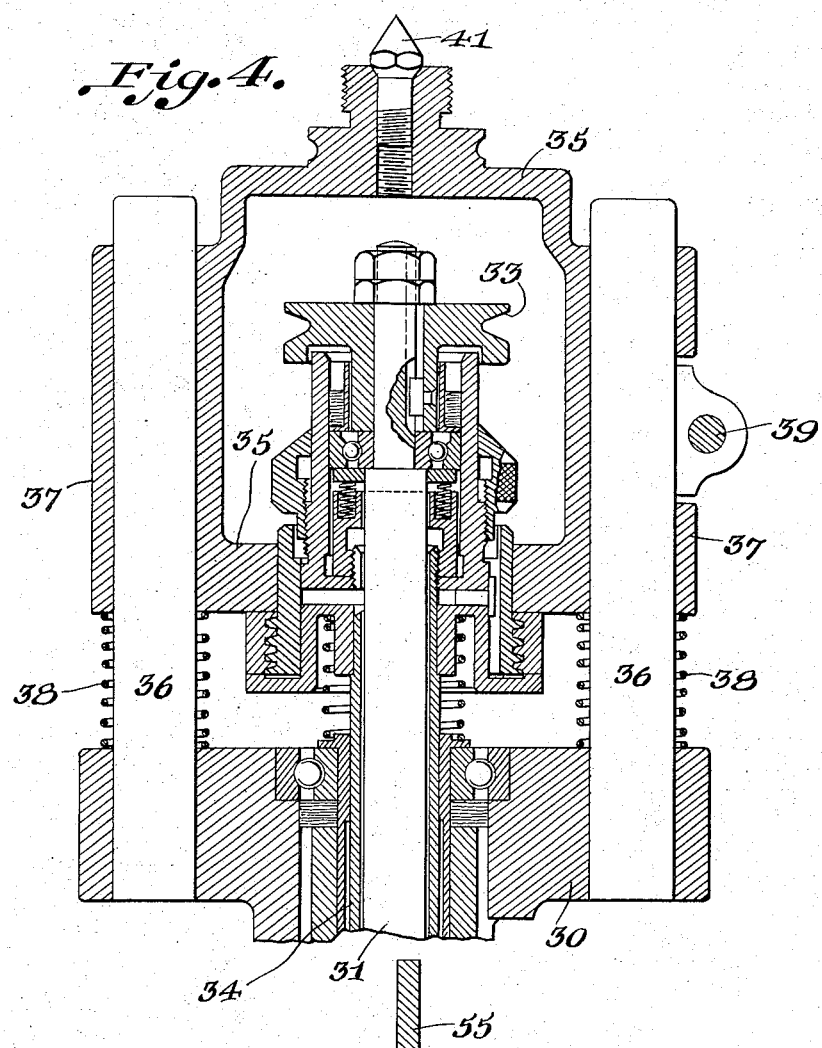
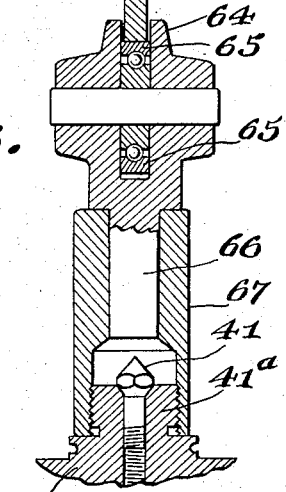

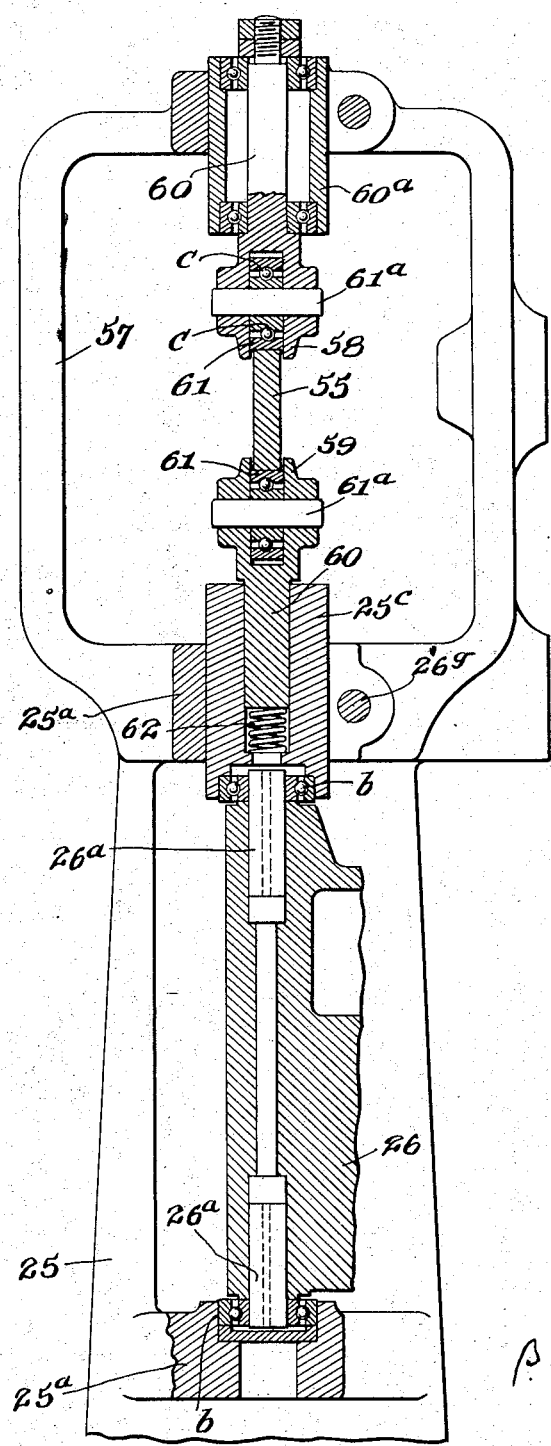

2,128,611

UNITED STATES PATENT OFFICE 2,128,611

ENGRAVING AND ALLIED MACHINE

Peter M. Henkes, Racine, Wis., assignor to George Gorton Machine Company, Racine, Wis., a corporation of New Jersey Application July 27, 1935, Serial No. 33,611

35 Claims. (Cl. 90—13.1)

This invention relates to engraving and allied machines, particularly those of the pantograph reproducing type; and the objects and nature of the invention will be developed by and in light of the following explanations of the accompanying drawings illustrating preferred mechanical expressions or embodiments of the invention from among other forms, structures, combinations and arrangements, within the spirit and scope thereof.

An object of the invention is to provide a three-dimensional-reproducing engraving machine organization comparatively economical in first cost and simple in structure, and including a pantograph of the parallelogram type composed of pivotally united links, hung from and bodily swingable laterally on a single pantograph carrying axis perpendicular to the plane in which the pantograph is swingable, and provided with a cutter spindle and a tracer movable with respect to the pantograph in parallel lines perpendicular to said plane for depth cutting and tracing, and also universally laterally movable over the work and copy or pattern under the control of the pantograph, with said pantograph constantly maintaining said spindle and cutter and pantograph axis in a common plane perpendicular to said plane in which the pantograph swings laterally, and maintaining the spacing relations between said spindle and tracer and the pantograph axis, with said pantograph adjustable to change and set said scaled relations between the spindle and tracer and the pantograph axis; and with means to control the depth cutting movements of said spindle by the depth tracing movements of said tracer, having a lever operatively associated with said tracer, spindle and suitable supporting means, and confined to swing laterally with the pantograph on the axial line of said pantograph axis, and also confined to swing on an axial line perpendicular to and intersecting the axial line of said pantograph axis, with the pantograph maintaining the spacing relations between said spindle and tracer and the axes on which said lever is swingable, and automatically changing said spacing relations, when adjusted and set to vary the spacing relations between the spindle and stylus, and pantograph axis.

Another object of the invention, is to produce a three-dimensional reproducing machine of this pantograph type, possessing possibilities of increased accuracy in producing work of a reduced size with respect to the copy, within the capacity of the machine, of the same reduction ratio for lateral dimensions and depth dimensions, within permissible commercial limits, without departing from the desired machine simplicity and economy.

A further object of the invention is to provide a three dimensional reproducing machine of the type disclosed, wherein the lever for controlling the depth cutting movements of the cutter spindle by the depth tracing movements of the tracer, is provided with means establishing a critical relationship between the axes on which the lever is swingable, and the single axis on which the pantograph is laterally swingable, and between the pantograph, cutter spindle and tracer, to assure the same reproducing ratio of the cutter in depth and lateral dimensional cutting, within machine tool limits, whether or not the transverse axis on which said lever swings vertically is in the same plane or straight line as the operative points of connection of the spindle and tracer with said lever, to attain theoretically, at least, mathematical accuracy, or is spaced vertically within short limits from said line or plane, for organization simplicity in small capacity machinery, but still in said critical relationship with the pantograph axis.

A further object of the invention is to provide certain improvements in elements, arrangements and combinations, for the production of a highly desirable and improved engraving machine of the pantograph type.

And a further object of the invention is to provide an engraving machine of the pantograph type with adjustable features, and certain means, whereby such machine will be capable of operating on a plane flat surface, or on a concaved or convex surface, or for three-dimensional or so-called modeling reproduction work.

With the foregoing and other objects hereinafter developed, in view, the invention consists in certain novel function performing features, structures, arrangements and combinations, more fully explained and specified hereinafter.

Referring to the accompanying drawings, forming part hereof:

Fig. 1 is a side elevation of a three-dimensional reducing reproducing engraving machine embodying the present invention, the machine supporting frame being partially broken away, the machine shown in this view being designed for making small products in reduced reproduction of the pattern or copy, where the required operative maximum vertical swing of the lever controlling the depth cutting movement of the cutter, does not exceed approximately ten degrees.

Fig. 2 is an end elevation looking from the right Fig. 1, the lower portion of the machine frame being broken away.

Fig. 3 is a top plan.

Fig. 4 shows the cutter head, in part, in central vertical section.

Fig. 5 is a vertical section in the plane of the axial line of the pantograph supporting axis, taken on the line 5—5, Fig. 1.

Fig. 6 is a detail vertical section on the line 6—6, Fig. 1.

Fig. 7 shows in side elevation the three-dimensional reducing reproducing engraving machine of Fig. 1, for instance, having a swivel mounting for the vertically swingable lever 55, adapting the organization particularly for producing large size work, in accurate reduced reproduction of copy or a pattern, within the commercial limits required.

Fig. 8 is a vertical section in the plane of the line 8—8, Fig. 7.

The machine frame, carries a usually horizontal work table 6, on which the work, to be operated on by cutter 32, preferably a rotary driven milling or other suitable tool, located above the table, is usually clamped. This table 6, is preferably vertically adjustable, and is also preferably adjustable forwardly and rearwardly and laterally in either direction, with respect to its base 7, all as usual or otherwise.

The machine frame also carries a preferably vertically adjustable usually horizontal copy or pattern table 4, preferably spaced laterally from the work table. The copy or pattern to be reproduced, usually in reduced size by cutter 32, is operatively normally clamped or otherwise fixed on table 4, all as usual or otherwise, for a reproducing operation.

The machine frame provides a fixed upstanding column or other rigid frame part 25, located to one side of tables 4, and 6, from which column a suitable pantograph is hung by a single vertical supporting axis to swing laterally in a normally fixed plane located above said tables, and perpendicular to said pantograph axis, and this pantograph carries a suitable stylus or tracer 45, and a suitable rotary spindle 31, for the depending cutter 32, and the tracer and cutter are universally movable laterally over the copy on table 4, and over the work on table 6, respectively, under the control of the operator and the pantograph. The longitudinal axes of the tracer and cutter are parallel with the pantograph supporting axis, in this example all of said axes are vertical.

The axial line of the pantograph supporting axis, i. e., said axis on which the pantograph is bodily swingable laterally, is located in Fig. 1, by the dotted line 5—5, and in Fig. 5, by the common longitudinal axis of the alined studs 26a, of the main supporting lever or link 26, of the pantograph.

Merely as an example, the frame part 25, is formed with elevated vertically-spaced laterally projecting upper and lower rigid pantograph supporting lugs 25a. The lower lug is bored from the top down to snugly or tightly receive the outer race ring of a suitable depressed end and radial thrust ball bearing b, so that the downwardly projecting vertical stud 26a, rigid with the end of laterally projecting pantograph lever 26, can snugly enter the open center of the inner race ring of said ball bearing with the bottom surface of said lever seated on said inner ring (Fig. 5). Said end of pantograph lever 26, is also equipped with a top upwardly projecting rigid stud 26a, longitudinally alined with and spaced vertically from the lower stud 26a. This upper stud 26a, is journaled to the upper machine lug 25a, through the medium of a ball bearing b, similar to the lower ball bearing and axially in alinement therewith and a longitudinally elongated slide block 25c, axially alined with studs 26a, and normally rigid with upper lug 25a.

The upper lug 25a, is in the form of a vertically bored split hub forming a split clamp provided with clamping bolt 26g, receiving the slide block 25c, and normally rigidly clamping the slide block 25c, but rendering the same vertically adjustable to take up looseness etc. in the joint between said pantograph lever and the lugs 25a, and to accurately maintain the pantograph in the desired plane perpendicular to its vertical supporting axis.

The pantograph disclosed presents one example of an embodiment constituting a successful solution of peculiar problems involving the production of an accurate comparatively simple pantograph peculiarly adapted to modeling or three dimensional reduced reproduction work as well as to engraving work, and to the location of the cutter and tracer in positions at the front of the machine under the unobstructed and convenient observation of the operator so that the operator has a clear view of the work, copy, tracer and cutter, during an engraving operation, with the pantograph located behind the tracer and cutter, without forwardly extending view-obstructing portions.

The particular pantograph illustrated, maintains the axes of the cutter and tracer to one side of and in a common straight line or vertical plane with the pantograph axis, the cutter axis being located between the tracer and pantograph axes, but of course, it is understood that for certain kinds of reproduction work, this pantograph can be arranged with its axis between the cutter and tracer axes, while still maintaining the desired scaling spacings between the pantograph axis and the axes of the cutter and tracer, respectively, or to provide other desired arrangements of the cutter and tracer with respect to the pantograph axis.

As more particularly illustrated by Fig. 3, the particular pantograph shown as one example of an embodiment of my invention, is of the jointed link, or link and lever, parallelogram type, and comprises the pivotally united elongated members or links 26, 27, 28, 29, pivotally united into parallelogram form on the spaced parallel vertical axes $p$, $pa$, $pb$, and $pc$. The link or member 26, constitutes the main long supporting lever of the pantograph and projects beyond one end thereof with its otherwise free end supported from and confined to the vertical pantograph supporting axis 5—5, (Fig. 1) defined by alined studs 26a, (Fig. 5). The opposite end of supporting lever 26, is pivotally united on vertical axis $pa$, to the rear end of long forwardly directed link or lever 28, the front or free end of which carries the vertical tracer 45, located at the free outer end of the pantograph. The vertical axis $pc$, pivotally uniting the front ends of the two links 27, 29, is located at the front of the pantograph, and in the example shown, the longitudinal axis of the cutter 32, is coincident or alined with said pivotal axis $pc$, and the cutter head for the cutter spindle is included in the pantograph at said front joint between pantograph links 27, 29, and hence located at the front of the pantograph. The links 27, 29, diverge rearwardly from the front pivotal connecting axis $pc$, and cross the levers 26, 28, respectively, and are pivotally united thereto by the connecting axes $p$, $pb$, respectively. The two levers or links 26, 28, diverge forwardly from the connecting axis $pa$, between their rear ends located at the rear of the pantograph, and between their ends, cross the links 27, 29, respectively.

Any suitable means are provided for adjusting and setting the pantograph to change the scaling distances between the tracer and cutter and the pantograph main axis 5—5. For instance, for this purpose, I show sliding adjustments and clamping means 28a, 29a, between links 28, 29; and 26f, and 27a, between lever 26, and link 27. In whatever adjustment the pantograph may be set, the cutter and the tracer throughout their universal lateral movements over the work and over the copy, during an engraving operation, are held by the pantograph in the scaled relation to which set, and in a straight line or common plane with the pantograph main axis, a plane perpendicular to the plane in which the pantograph swings. Also, the pantograph throughout its swinging movements maintains the cutter and tracer with their longitudinal axes vertical and perpendicular to the plane in which the pantograph swings and maintains the cutter and tracer against relative movements with respect to the pantograph, longitudinally of pantograph links or levers, i. e. the tracer is held against relative movements longitudinally with respect to long arm or link 28, and the cutter against relative movements longitudinally with respect to links 27, 29.

In this example, the cutter head is carried by and included in the pantograph and is universally movable laterally thereby in a normally fixed horizontal plane above the work table. In this instance, the cutter head housing 30, is located at the front ends of the pantograph links 27, 29, and is visible and accessible at the front of the machine.

The cutter head assembly and the cutter spindle feed that I happen to illustrate, without intending to so limit myself, are of the general type and operation disclosed by the George Horner Patent No. 1,562,237, dated November 17, 1925, and this cutter head is adapted for operating on plane or flat surface work, and for operation in connection with a so-called forming guide on concave, convex, or partially spherical work surfaces.

The vertical rotary cutter spindle 31, at its lower end carries and drives the vertical milling, routing, engraving or other cutter 32, and is driven by any suitable belt drive, not shown in detail, through the medium of belt pulley 33, located in the upper portion of the cutter head concentric with spindle 31, and operatively coupled thereto, in driving relation, even though the vertical elevation of the pulley with respect to the spindle varies under certain conditions.

The spindle 31, is mounted to rotate in a feed or slide barrel 34, which carries the spindle longitudinally and maintains the same in operative and in withdrawn positions.

In this particular example, the spindle driving pulley 33, is carried by and movable vertically with a so-called feed yoke or supplemental frame 35, that is carried by the cutter head housing 30, through the medium of vertical guide posts 36, rigid with the cutter head housing, and vertical guide tubes 37, rigid with the yoke 35, and receiving said posts. Coiled longitudinally expanding springs 38 are mounted on the posts 36, and seated on the housing 30, and at their upper ends seated against the lower ends of the yoke. One or both of the slide tubes 37, of said yoke is or are longitudinally split to form split clamps and each provided with a clamping screw 39, by which one or both tubes can be contracted to tightly grip the guide post or posts 36, and thereby lock said yoke to said cutter head housing against relative movement, preferably with the springs 38 compressed. When the feed yoke 35, is thus locked against vertical movement with respect to the cutter head housing 30, the cutter head is adapted for operating on the work in a fixed horizontal plane, in other words, for plane or flat surface engraving, the cutter head being universally movable laterally over the work by the pantograph with the cutter working at uniform depth in a horizontal plane.

By operating clamp screw 39, to release the feed yoke to freely slide vertically on the guide rods 36, under the control of springs 38, the cutter spindle and its barrel are released to float vertically with the feed yoke 35, under the guidance of any suitable forming guide 40, the curved smooth working surface of which is the reverse of the concaved, convex, or semi-spherical surface of the work on which the engraving cutter is to operate. Where such work is to be performed, the feed yoke 35, is formed or provided with a rounded tip upwardly projecting point 41, alined with the longitudinal axis of the cutter spindle, and this point is held by springs 38, yieldingly bearing upwardly against the working surface of the forming guide to slide freely thereover as the cutter head is propelled laterally by the pantograph, to control the elevation and depression of the cutter spindle to accord with the elevation and depressions of the curved work surface, broadly as described by the hereinbefore mentioned patent.

In the example shown, any suitable forming guide 40, shaped to meet the requirements of the particular job to be performed, is removably clamped to the under portion of the front end of a comparatively long rigid bracket 42, projecting forwardly from and approximately at right angles to the free end of a vertically swingable long supporting arm 43. The rear end of bracket 42, fits the longitudinally channeled or slotted arm 43, whereby the bracket 42, is adjustable longitudinally of said arm, and suitable clamping means 43b, is provided for rigidly clamping the bracket to the arm in the desired adjustment longitudinally of said arm.

The left-hand (Fig. 1) portion of the supporting arm 43, is located to the rear of the lower or base portion of the upright rigid top yoke 57, of frame column 25, and at its depending lower corner is mounted to swing vertically on the stud 43a, projecting rearwardly from and rigid with said yoke. Above the fulcrum 43a, the arm is formed with a closed end slot 44a, concentric with said fulcrum, receiving screw clamping means 44, from the yoke by which the arm can be rigidly clamped to the yoke, and by which the arm is limited on its upward and downward swinging movements.

The arm 43, is swingable to its upward limit to the inoperative or out-of-the-way position disclosed by Figs. 1 and 2, in which it is clamped by means 44, or to its horizontal operative position in which it is rigidly held by clamping means 44, with its forming guide bracket 42, extending forwardly to rigidly hold the forming guide above and in operative relation to the point 41, of the spring-pressed vertically floating means carrying the rotary vertical cutter spindle The long arm 43, is preferably arranged to swing in a vertical plane located to the rear of the vertical plane of the work table. The limit of downward swing or adjustment of the long arm 43, is above the horizontal levels of the pantograph and of the bearing point 41.

When the cutter head is to be employed for flat plane surface work or for three dimension work such as modeling, die sinking, etc., the long arm 43, is swung upwardly and secured in its elevated inoperative position, as in Fig. 1. When the cutter head is to be employed for engraving a curved surface, requiring a forming guide, the long arm 43, is released and swung down to horizontal operative position and rigidly secured in such position, holding the properly applied removable forming guide in the operative position to which it has been adjusted and set.

In the example illustrated, the copy tracing stylus 45, is arranged at the front right hand end of the pantograph over the copy table 4, and is carried by the extended end of pantograph arm 28, through the medium of vertical stylus spindle 46, longitudinally alined with the vertical axis of the stylus which is parallel with the longitudinal axis of the cutter 32, and its spindle. The stylus spindle 46, is vertically elongated and extends vertically through and above a pair of guide eyes 47, having alined vertical bores, rigid with the pantograph arm 28, and widely separated vertically. Under certain conditions, said spindle is longitudinally slidable in said eyes to a limited extent. Under other required conditions, said spindle can be clamped against relative vertical movement in said eyes, as by clamping screw 48, carried by lower eye 47. Coiled expansion spring 49, is loosely and longitudinally arranged on said spindle between the eyes 47. This spring 49 is arranged between two spring abutment collars 50, and said spindle. Each collar 50, has a clamping screw 51, whereby the collar can be rigidly clamped on the spindle or released therefrom to slide freely thereon between the adjacent end of the spring 49, and the adjacent eye 47. When both collars 50, are loose on said spindle, the spring is neutral with respect to the spindle, and the spindle can be pushed freely up or down in the eyes. When both collars 50 are clamped to the spindle, the upward and downward movements of the spindle are thereby limited by engagement of collars with the eyes but without spring actions. When the upper collar is fixed to the spindle and the lower collar loose thereon, the spring will yieldingly resist continued downward movement of the spindle and when the lower collar is fixed to the spindle and the other loose thereon, the spring will yieldingly resist continued upward movement of the stylus spindle through the eyes, all of which are functional under various conditions of engraving and three dimension work for which the machine is adapted.

The pantograph swings laterally in a fixed horizontal plane during an engraving operation and thus carries the cutter head and the stylus spindle 46 laterally. When the upper part of the cutter head, such as feed yoke 35, is clamped to posts 36 for plane or flat surface engraving, the cutter during an engraving operation, moves in a horizontal plane, and the tracer or stylus spindle 46, during such operation moves in a horizontal plane in tracing the copy, and can be clamped to the pantograph arm 28, if so desired, against relative vertical movement, or can be released from said arm for free vertical movement. If so desired, the stylus spindle 46, is freed from the action of the spring 49, during flat surface engraving.

When the machine is adjusted for curved surface engraving in cooperation with a curved surface forming guide 40, stylus spindle 46, moves laterally in a horizontal plane while tracing the flat copy, and can be arranged with respect to pantograph arm 28, and stylus spindle spring 49, as just described where the machine is set for flat surface engraving.

When the feed yoke 35, is released to float vertically with the rotary cutter and its spindle; the springs 38 serve to approximately balance the same but more or less lightly hold the tracing point 41, constantly up in sliding contact with the curved surface of the forming guide 40, while the main portion or housing 30 of the cutter head moves in its fixed horizontal plane with the pantograph.

When the machine is adjusted or set for three dimensional or modeling reduced reproduction of copy, the cutter spindle and the tracer are floatable or movable longitudinally, vertically in this example, with respect to the horizontally swingable pantograph, the cutter spindle being, preferably, spring-pressed upwardly, and the arm 43, is secured in its out-of-the-way, inoperative position, and motion-transmitting cutter spindle controlling mechanism is provided, in operative association with the frame, pantograph, cutter spindle and tracer, to control the vertical movements and positioning of the cutter spindle by the vertical movements and position of the tracer. This mechanism includes a bar or lever 55, which is confined to vertical swing on a transverse axis perpendicular to and intersecting the axial line of the pantograph axis 5—5, and which lever is also confined to lateral swing with the pantograph on the axial line of said pantograph axis. This location of the axes on which said lever is swingable, I find to be critical in gaining certain results. This lever is operatively associated with the tracer and cutter spindle to control the depth cutting or vertical movements of said spindle by the depth tracing or vertical movements of the tracer, and to permit relative movements in directions longitudinally of the lever between the tracer, spindle, and lever axes, during an engraving operation, and when the pantograph is adjusted and set to vary the reproduction ratio.

In the particular examples illustrated, without desiring to so limit all features of the invention, the lever 55, is positively coupled to the tracer as by transverse pivot 56, against relative lost motion and against relative movements longitudinally of the lever, and the lever is so mounted as to permit longitudinal movement of the lever with respect to the said axes of the lever, and the operative connection between the lever and the cutter spindle is such as to permit relative movements between the same in directions longitudinally of the lever.

The operative association of the lever 55, with its mounting and the tracer and cutter spindle is such, that the pantograph maintains, throughout an engraving operation, the same spacing relations between the pantograph axis, and the cutter spindle and tracer, respectively, and between the lever axes, and the cutter spindle and tracer, respectively, and when the pantograph is adjusted and set to change the reproducing spacing between the cutter spindle and tracer, respectively, and the pantograph, the spacing between the cutter spindle and tracer, respectively, and the axes of lever 55, are similarly and automatically changed.

In the example disclosed by Figs. 1, 2 and 5, I show a strong stiff non-extensible lever 55, of fixed length, preferably provided with straight parallel top and bottom longitudinal edges or tracks throughout the major portion of its length extending to its free end, the left hand end Fig.

1. The right hand end of this lever, Fig. 1, is pivotally coupled against lost motion, by transverse pivot 56, to a vertical bracket 56a, having a contractile socket controlled by clamping means, such as screw 56b, by which the bracket can be detachably secured against lost motion on the upper end of the tracer spindle 46.

The vertical movements and positioning of the floating spring pressed cutter spindle 31, are controlled by the lever 55, through a suitable operative association between the spindle and lever, permitting relative movements in directions longitudinally of the lever and maintaining the lever and spindle against relative movements in directions transversely with respect to the lever.

In this example, the frame 25, is provided with an upstanding yoke or rigid portion 57, the lower portion of which provides the slide block 25c, in the clamping hub 25a, longitudinally alined with the pantograph axis, and the top of which carries the slide block 60a, normally rigidly held by the clamping hub 57a, also in longitudinal alinement with the pantograph axis (Fig. 5). The lever 55, extends through and is mounted in the frame upright 57, by and between upper and lower rounded or rolling contacts, such as rollers 61, bearing against the upper and lower longitudinal tracks or edges of the lever and holding the lever against relative vertical lost motion while permitting free and easy longitudinal travel of the lever on said rollers. By suitable formation or means, the lever is held to the circumferential treads of the rollers and against lateral deflection therefrom. The rollers 61, are carried by alined upper and lower vertical spindles 60, accurately alined with the axial line 5—5, of the pantograph axis, and these spindles 60, are mounted, to rotate on said axis, one in the lower slide block 25c, and the other in the upper slide block 60a. In this example, the lower end of the upper spindle, and the upper end of the lower spindle, form forks 58, 59, respectively, lapping the side faces of the lever. The rolling contacts are mounted in said forks to rotate on parallel transverse axes 61a, that are perpendicular to and intersect the common axes of the spindles 60, and consequently the axial line 5—5, of the pantograph axis. Where the lever 55, mounting provides rolling contacts between which the lever 55, is held against lateral and vertical displacement, and on which it is vertically rockable and between which it is longitudinally movable, I prefer to form said contacts by rollers mounted on roller bearings against vertical lost motion.

To maintain the desired positive engagement of the rolling contacts 61, with the top and bottom longitudinal tracks or edges of the lever 55, one of the spindles 60, preferably the lower spindle, is afforded slight vertical play in its bearing and is under the limited upward urge of a short expansion spring 62, to maintain upward pressure of the lever against the upper rolling contact 61.

Operative coupling or connection is established between the lever 55, and the cutter spindle 31, and its sliding quill or barrel 34, for depth dimensional work, as for example, by the organization disclosed by Figs. 1 and 6, without desiring to so limit the invention. This specific example includes an upwardly spring-pressed vertical fork 64 straddling the longitudinal lower edge of lever 55, and slidably lapping the opposite vertical side faces thereof against objectionable relative lateral play, and pressing the flat tread of a freely rotatable roller 65, upwardly against the flat lower longitudinal edge of said lever. The roller is depressed in the fork 64 and is mounted to freely revolve on balls or rolls, on a horizontal axis arranged transversely of the lever so that the lever can freely travel endwise through the fork when so impelled by the lateral movements of the stylus spindle, while the fork and its roller are pressed upwardly against the lever edge whether the lever is swung up by upward movement of the stylus spindle or whether the fork 64, is being depressed by downward swing of the lever as the stylus spindle is depressed in following the depth of the copy.

The fork 64 is carried by a depending vertical spindle 66, rotatable on its longitudinal axis in and carried by a coupling sleeve 67, internally screw threaded at its lower open end, to removably screw onto the externally threaded boss 41a, of yoke 35, from which the forming-guide-tracing point 41 projects upwardly.

The longitudinal axis of rotary fork spindle 66, is alined with the vertical axes of point 41, and the rotary cutter spindle of the cutter head.

The fork 64 and its roller 65 are spring pressed and yieldingly and constantly held up against lever 55 by the springs 38, by which the cutter head yoke 35 and the cutter spindle and cutter are rendered vertically floatable. These springs 38 are designed to approximately slightly overbalance the yoke 35, and its load, but if more or less either cooperating or opposing spring pressure is required to render the vertical movement of the tracer spindle in following the elevations and depressions of the copy and in performing work in vertically swinging the lever 55, and depressing the cutter head yoke 35 and its load, more easy and quickly responsive, the spring 49 on the stylus can be brought into action as hereinbefore described.

To adapt the engraving machine illustrated, for three dimensional or modeling reproduction work, the screw coupling 67, carrying the fork 64, is screwed to position on the cutter head yoke 35, as disclosed by Fig. 6, and the lever 55, is inserted free end foremost between the upper and lower forks 58, 59, and their rolling contacts 61, and the lower longitudinal edge portion of said lever is fitted into the cutter spindle fork 64, and down on the rolling contact 65, and the contractile clamp 56a, is fitted down on the upper end of tracer spindle 46, and tightly clamped thereto.

When it is desired to employ the engraving machine, for other work than modeling, if necessary, the modeling attachment can be quickly and easily removed, by releasing the clamp socket 56a, from the tracer spindle, and then lifting the same therefrom by upward swing of lever 55, and longitudinal withdrawal of said lever from its mounting, i. e. from forks 58, 59, and their rolling contacts. The coupling 67, can be easily removed from the cutter head yoke 35, with the fork 64.

However, I do not wish to limit all features of my invention to an engraving machine of the specific type disclosed, apart from the modeling or three dimensional reproduction feature, or to a machine wherein such feature is attachable or detachable.

The swivel mounting for the left hand end (Fig. 1) of lever 55, shown more in detail by Fig. 5, was intended for and has been built and is in successful use in commercial three dimensional reproducing or modeling machinery of this invention, particularly intended for comparatively light small work, as for making small reproduced reduced products, such as medals, medallions, ring and other jewelry parts or mountings. This mounting for lever 55, was found to be particularly adapted for such machine for small work, because of its simplicity and economy, in view of the required comparatively low cost of such machine for small work. Said swivel mounting (Figs. 1 and 5) in such modeling machines for comparatively light or small work, produces the reduced product from the copy of the same reduction ratio for all three dimensions, within the tolerance or accuracy limits necessarily allowed for all machine work, and in my said machines, for production of said small reduced products, the range of vertical depth swing of lever 55, does not exceed an arc of approximately ten degrees, five degrees above and five degrees below, approximately, the normal horizontal position of the lever 55. The theoretical error in depth cutting is so infinitesimal as to be practically non-existent and of no practical moment, and is far less than the accuracy limits necessarily allowed for even precision machinery.

In three dimensional reducing reproduction or modeling work, where the swiveling mounting for the depth scaling lever 55, disclosed by Figs. 1 and 5, is employed, the axis 61a, of roll 61, in upper yoke 58, is the transverse axis perpendicular to and intersecting the axial line of the pantograph, on which lever 55 swings during depth tracing and cutting. In this simple inexpensive mounting for lever 55, the transverse axis 61a, of upper roll 61, on which said lever swings vertically is spaced vertically a short distance from the straight line or plane in which the operative connections between lever 55, and the cutter spindle and tracer are located, instead of being also located in said plane or line to attain mere theoretical mathematical accuracy. However, I have found that the location of said transverse axis perpendicular to and intersecting the axial line of the pantograph axis, is critical, rendering it possible to locate said transverse lever axis spaced a short distance vertically from said straight line or plane, without departing from the requirement that the reproduced work disclose the same ratio of reduction for all three dimensions for practical commercial purposes and within accuracy limits.

For more expensive modeling machinery of this invention, designed particularly for large capacity reproduction work requiring greater depth cutting and extensive vertical swinging range of lever 55, having the capacity of producing relatively large size reproduced products, I employ a swivel mounting for lever 55, that is more complicated and expensive than that embodied in the machine of Fig. 1. For instance, in Fig. 7, I show the machine of Fig. 1, with the depth cut controlling lever 55, of Fig. 1, operatively connected in association with the tracer 45, and the cutter spindle 31, as in Fig. 1, but provided with a modified swivel mounting operatively confining the same to the machine frame. In this construction, I provide a vertical open loop or yoke 8, carried by the frame 25, and a rigid upward extension 57a, thereof and thereby held to rotate on a fixed vertical axial line in alinement with the pantograph axis 8—8, (Fig. 7). This yoke 8, is provided with alined vertical upwardly and downwardly projecting studs or journals 9, rigid therewith, alined with the pantograph axis. The depending stud 9, is suitably journaled in the upper end of slide box 25h, which corresponds to slide block 25c, Fig. 5, and is preferably adjustable and secured as is block 25c. The upwardly projecting stud 9, is suitably journaled to rotate in the lower end of slide block 60h, which is adjustable vertically in and normally rigidly held by split clamping hub 60i, forming a part of the upward rigid extension 57a, of frame 25.

Within and carried by the horizontally rotatable yoke 8, I provide a normally-vertical loop-like or annular bracket 10, providing a central opening for the passage of the lever 55. This bracket 10, is confined and mounted in the yoke 8, to swing vertically on a transverse axis 10a, that is perpendicular to and intersects the axial line of the pantograph axis, and that is located in the same straight line or plane 10b, as the effective points of operative connection of the cutter spindle and the tracer with the lever 55.

The bracket 10, provides rigidly connected opposite side members 10b, between which the lever 55, freely passes, upheld therein against relative vertical movement, for example, by a pair of spaced rolling contacts, such as rollers 10c, bearing on the top longitudinal track or edge of the lever, and, for example, by a centrally arranged lower rounded support, such as roller 10d, bearing on the lower longitudinal track or edge of said lever. The lever is held between these upper and lower rollers against relative vertical and lateral lost motion, and yet is free for straight-line endwise movement on said rollers through the bracket. By any suitable formation or means, the lever is held against lateral movement on or displacement from said rollers. For instance, the rollers can have projecting peripheral edge flanges 10e, lapping the side faces of the lever, or the lever can have top and bottom longitudinal depressed trackway in which the rollers fit and travel.

The rollers rotate on horizontal parallel axes that perpendicularly intersect the plane in which the lever 55, swings vertically, and, if so desired, these axes can be established by pins or spindles 10f, extending transversely through and normally fixed in the side members of the bracket 10.

In the example shown, a pair of alined transverse horizontal trunnions 11, normally fixed to and extending inwardly through the opposite side uprights of the yoke 8, support the bracket 10, in and from said yoke and establish the horizontal transverse axis on which said bracket is swingable vertically with the lever 55, and hence fix the fulcrum of said lever. If so desired, the projecting inner ends of trunnions 11, can form pointed cones seated in complementary conical bearings formed in the axle or spindle 10f, of the lower roller 10d. This axis or fulcrum established by said trunnions and the axis of roller 10d, is perpendicular to and intersects the axial line of the pantograph axis, and is also located in the straight line or plane 10b, that includes the operative connections between lever 55, and the cutter spindle and tracer to attain mere theoretical mathematical accuracy in reproducing depth, length and width in, the work.

The rollers in bracket 10, support the lever 55, against relative vertical motion, and hence the bracket oscillates or swings vertically with the lever on the axial line of roller 10d, and the lever 55, is also held in bracket 10, against relative lateral movement or swing, and the trunnions 11, hold the bracket 10, in and to the yoke against relative lateral swing on a vertical axis, hence the bracket 10, and the yoke 8, rotate on the axial line of the pantograph axis with the lever 55, when said lever swings laterally with pantograph when the pantograph so swings on its axis.

The depth scaling lever 55, where the mounting of Fig. 7 is employed in the machine of Fig. 1, is endwise removable and applicable, as hereinbefore explained in describing the machine of Fig. 1, and in the depth scaling organizations of either Figs. 1 or 7. I do not wish to limit all features of my invention to the removable connection 56a, 56b, between the tracer and the lever 55, as a direct non-loss motion pivotal connection, such as 56, can be employed, particularly where the lever 55, is employed as a permanent part of a modeling machine of this invention.

The operation of the embodiments disclosed, and the various operatively-associated parts thereof, in performing their intended function, will be understood from the foregoing explanations. Fig. 1 shows the machine in front elevation, and the right hand side of Fig. 3, is the machine front. In modeling and engraving operations, the operator is located in front of the machine, and by hand manipulates the free end of the pantograph direct or through the tracer spindle, to swing the pantograph bodily and to cause the links thereof to horizontally swing on the pivotal connecting axes, as the tracer follows the three dimensions of the copy, all while the operator has clear obstructed view of the copy, work, tracer and copy because of the peculiar pantograph organization, hereinbefore described.

The species of a swivel mounting directly coupling the lever 55, to the supporting frame, disclosed by Figs. 1, 2, and 5, includes an upper yoke or fork 58, held against upward movement and oscillatory or rotatable horizontally about a vertical axial line 60—26a; and a bracket provided by roller member 61, transversely arranged in yoke 58, between and overhanging the depending legs of said yoke, and mounted to and within said yoke by concentric ball bearing c, and cross shaft 61a, between said legs, to relatively freely oscillate or rotate in either direction on the axial line of said shaft 61a, under appropriate movement of lever 55, thereby establishing, in this example, an axis 61a, on which said lever 55, is vertically swingable. This axis on which said bracket-constituting roller 61, is oscillatory, substantially intersects said vertical axial line 60, 26a, at right angles. The bracket-forming roller 61, supports and holds the fulcrumed portion of the lever 55, against upward movement, under the lever elevating action of the upwardly spring-forced lower fork or yoke 59, constantly holding the top edge of lever 55 against and into operative contact with the circumference of said roller 61, under pressure radially of said roller and its axis 61a.

This application includes and claims the disclosure and invention of my Engraving machine application Serial No. 693,175, filed October 11, 1933, and takes its filing date and is a continuation thereof as to disclosures common to the two applications.

Disclosure of examples of embodiments of my invention, is made hereby for purposes of explanation, and not for strict limitation, as it is my desire and intention to cover my invention both as broadly and as specifically, as is legally possible over the prior art, as various changes, modifications, and departures, are possible within the spirit and scope of the invention defined by the following claims.

What I claim is:

1. A pantograph reproducing machine, including a pantograph, swingable laterally in a normally fixed plane parallel with the plane or planes of the copy and work; a longitudinally floatable driven cutter spindle having its longitudinal axis perpendicular to said plane and movable universally laterally over the work by said pantograph; a longitudinally movable spindle for the copy tracing stylus having its longitudinal axis parallel with the axis of said cutter spindle and movable laterally over the copy with said pantograph; and a laterally and vertically swingable vertical-movement-scaling lever from said stylus spindle to said cutter spindle for transmitting the vertical movements of the stylus spindle to the cutter spindle in scaled relation; said lever having a support independent of said pantograph and spindles, said support providing an axis parallel with the axes of said spindles, on which said lever is laterally swingable, said support also providing a transverse axis on which said lever is vertically swingable, said lever being endwise movable with respect to said support under the lateral movement of said stylus spindle.

2. A pantograph reproducing machine, including a supporting frame; a pantograph pivotally hung from the frame to swing laterally in a normally fixed plane; a stylus spindle carried by said pantograph; means whereby said stylus spindle can be rendered longitudinally movable with respect to said pantograph; a cutter head carried by said pantograph, laterally over the work, said cutter head provided with a driven cutter spindle; means whereby said cutter spindle can be held against longitudinal floating, with respect to the pantograph, for engraving in a fixed plane perpendicular to the longitudinal axis of said spindle, and whereby said cutter can be released for longitudinal floating relative to the pantograph, for engraving curved surfaces in association with a forming guide or for depth cutting; means for spring-pressing said cutter spindle when released for longitudinal floating; and a laterally and vertically swingable lever connection from said stylus spindle to said spring-pressed floatable cutter spindle for transmitting the longitudinal movements of the stylus spindle to the cutter spindle in scaled relation, said pantograph maintaining the scaled relation of the lateral movements of the stylus spindle transmitted to the cutter spindle substantially the same as the scaled relation of the stylus spindle longitudinal movements transmitted to the floating cutter spindle, said lever connection being operatively detachable and attachable.

3. A reproducing machine of the pantograph type, including a laterally swingable pantograph adjustable to control the reproduction ratio; a copy tracing stylus carried by said pantograph and capable of longitudinal movement with respect thereto in tracing copy depth; a rotary cutter spindle universally movable laterally over the work with the pantograph; said cutter spindle capable of relatively floating longitudinally toward and from the work for depth cutting; spring means capable of acting longitudinally on said floating cutter spindle; spring means capable of acting longitudinally on said vertically movable stylus in either direction; and a scaling lever connection for transmitting the longitudinal movements of said stylus to said floating cutter spindle in the same scaled relation as the pantograph transmits the lateral movements of said stylus to said cutter spindle.

4. A reproducing machine of the pantograph type, including a supporting frame; a laterally swingable pantograph hung from said frame to swing on an axis perpendicular to the plane in which the pantograph is movable; a copy tracing stylus carried by the pantograph and capable of relative longitudinal movement in tracing copy depth; a cutter spindle carried laterally by the pantograph and relatively longitudinally movable for depth cutting; a scaling lever operatively associated with said stylus to transmit the longitudinal movements thereof, and having operative relation to said cutter spindle to control the longitudinal movements thereof; said frame providing a support for said lever oscillatory on an axis alined with said axis on which the pantograph is swingable, said support also providing a transverse axis on which said lever is swingable as the stylus moves longitudinally, said lever being swingable laterally on said axis that is alined with said pantograph axis, as the stylus and consequently the pantograph moves laterally.

5. A reproducing machine, including a supporting column; a laterally swingable pantograph pivotally hung from said column; a copy tracing stylus carried by said pantograph; a cutter head carried laterally by said pantograph and including a rotary cutter spindle capable of floating vertically with respect to the pantograph and provided with a member floating therewith and having the point to bear up against and slide over the surface of a forming guide; an elongated vertically swingable rear arm pivoted to said column, the free end of said arm provided with a forwardly extending normally fixed bracket adjustable longitudinally of said arm and at its front end removably carrying a forming guide, said arm swingable upwardly to elevated out-of-the-way position and downwardly to operative position with its forming guide in operative position with respect to said point, and means for clamping the arm to the column in operative and in said elevated positions.

6. A pantograph reproducing machine, including a laterally swingable pantograph; a longitudinally floatable cutter spindle movable universally laterally over the work by said pantograph; a longitudinally movable spindle for the copy tracing stylus movable laterally over the copy with said pantograph; and an endwise movable and laterally and vertically swingable vertical-movement-scaling lever from said stylus spindle to said cutter spindle for transmitting the longitudinal movements of the stylus spindle to the cutter spindle in scaled relation; said lever having a support providing an axis parallel with the axes of said spindles, on which said lever is laterally swingable, said support also providing a transverse axis on which said lever is vertically swingable.

7. A pantograph reproducing machine, including a supporting frame; a pantograph pivotally hung from the frame to swing laterally in a normally fixed plane; a stylus spindle for said pantograph; means whereby said stylus spindle can be rendered longitudinally movable; a cutter head laterally movable over the work under the control of said pantograph, said cutter head provided with a spindle; means whereby said cutter spindle can be held against longitudinal floating, for engraving in a fixed plane perpendicular to the longitudinal axis of said spindle, and whereby said cutter can be released for longitudinal floating for engraving curved surfaces in association with a forming guide or for depth cutting; means for spring-pressing said cutter spindle when released for longitudinal floating; means for removably carrying a forming guide in operative relation to said floating cutter spindle; and a universally movable lever connection from said stylus spindle to said spring-pressed floatable cutter spindle for transmitting the longitudinal movements of the stylus spindle to the cutter spindle in scaled relation, said pantograph being adjustable to determine the scaled relation of the lateral movements of the stylus spindle transmitted to the cutter spindle and to maintain the same scaled relation of the stylus spindle longitudinal movements transmitted to the floating cutter spindle, during the lateral movements of the pantograph.

8. A reproducing machine of the pantograph type, including a laterally swingable pantograph adjustable to control the three dimensional reproduction ratio and provided with a copy tracing stylus universally movable laterally for two dimensional copy tracing and also capable of longitudinal movement in tracing copy depth; a cutter spindle universally movable laterally over the work with the pantograph; said cutter spindle capable of moving longitudinally toward and from the work for depth cutting; and a scaling lever for transmitting the longitudinal movements of said stylus to said longitudinally movable cutter spindle in the same scaled relation as the pantograph transmits the lateral movements of the said stylus to said cutter spindle, the depth transmitting ratio of said lever being set and controlled by said pantograph.

9. A reproducing machine of the pantograph type, including a supporting frame; a pantograph hung from said frame to swing laterally on a substantially perpendicular axis; a copy tracing stylus for controlling the lateral movements of the pantograph and capable of longitudinal movement in tracing copy depth; a cutter spindle moved laterally by the pantograph and longitudinally movable for depth cutting; and a scaling leverage connection operatively associated with said stylus to transmit the longitudinal movements thereof, and having operative relation to said cutter spindle to control the longitudinal movements thereof; said frame providing a support for said leverage connection oscillatory on an axis alined with said axis on which the pantograph is swingable, said support also providing a transverse axis on which said connection is swingable as the stylus moves longitudinally, said connection being movable endwise with respect to said support and axes and being swingable laterally on said axis that is alined with said pantograph axis, as the stylus and consequently the pantograph moves laterally.

10. A reproducing machine comprising a support; a pantograph coupled to said support to swing laterally on a substantially perpendicular axis, and provided with a pattern tracing stylus vertically movable in tracing copy depth; a cutter movable laterally over the work under the control of the pantograph and vertically movable for depth cutting in the work; a scaling leverage connection operatively associated with said stylus and with said cutter to transmit the stylus vertical movements to the cutter to control the cutter vertical movements; said leverage connection including a vertically and laterally swingable lever; and complementary upper and lower confining and guiding forks for said lever supported for rotary movement on a vertical axis, said lever being endwise movable and vertically swingable with respect to said forks, said lever being laterally swingable on said vertical axis on which said forks are rotatable.

11. A reproducing machine including a frame; a laterally swingable pantograph supported on said frame and provided with a copy tracing stylus universally movable laterally for two dimensional copy tracing and also movable vertically to folow copy depth; a cutter universally movable laterally over the work under the control of the pantograph and also movable vertically for depth cutting the work; and a single scaling cross lever operatively associated with the pantograph, frame, stylus and cutter for transmitting said vertical movements of the stylus to the cutter in the same scaled relation that the pantograph transmits the lateral movements of the stylus to the cutter.

12. A reproducing machine including a frame; a laterally swingable pantograph supported on said frame and provided with a copy tracing stylus movable vertically to follow copy depth; a cutter movable laterally over the work under the control of the pantograph and movable vertically for depth cutting the work; and movement transmitting means operatively associated with the pantograph, stylus and cutter for transmitting said vertical movements of the stylus to the cutter in the same scaled relation that the pantograph transmits the lateral movements of the stylus to the cutter, said means including an elongated laterally swingable lever, and a support for the lever carried by said frame and comprising complementary upper and lower forks between which said lever is confined, said forks being oscillatory on a common axial line establishing the axis on which the lever is swingable laterally.

13. A reproducing machine including a frame; a laterally swingable pantograph supported on said frame and provided with a copy tracing stylus movable vertically to follow copy depth; a cutter movable laterally over the work under the control of the pantograph and movable vertically for depth cutting the work; and movement transmitting means operatively associated with the pantograph, stylus and cutter for transmitting said vertical movements of the stylus to the cutter in the same scaled relation that the pantograph transmits the lateral movements of the stylus to the cutter, said means including an elongated lever mounted for endwise movement and laterally and vertically swingable, and a support for said lever carried by said frame and comprising upper and lower rollers held in operative association with top and bottom longitudinal portions of the lever, respectively; and means for carrying the rollers and for retaining the lever against lateral displacement therefrom.

14. Engraving apparatus including a frame; a laterally swingable pantograph carried thereby and provided with a copy tracing stylus vertically movable for tracing copy depth; a cutter floatable vertically for depth cutting in the work and laterally movable over the work under the control of the pantograph; and movement transmitting mechanism for transmitting said vertical movements of the stylus in scaled relation to the cutter to control the vertical cutter movements, said mechanism including a swingable lever, and a fork movable vertically with said cutter and straddling and bearing against said lever, and axially movable on a vertical axis with respect to said cutter.

15. A reproducing machine, including a frame; a laterally swingable pantograph supported thereby and provided with a copy tracing stylus vertically movable for copy depth tracing; a cutter laterally movable over the work under the control of the pantograph, said cutter being vertically movable for depth cutting in the work; and mechanism for controlling the depth cutting vertical movements of the cutter and being controlled by the depth tracing vertical movements of the stylus, said mechanism comprising a swingable lever, and a support for said lever establishing an axis on which said lever is swingable laterally and a transverse axis on which said lever is swingable vertically, said support provided with a roller rotatable on said transverse axis, and means holding said lever and roller in operative engagement.

16. In reproducing apparatus, a pantograph provided with a copy tracing stylus vertically movable for copy depth tracing, and a cutter movable laterally over the work under the control of the pantograph and vertically movable for depth cutting in the work, and mechanism for transmitting said vertical movements of the stylus in scaled relation to said cutter to control the vertical depth cutting movements thereof, including spring means to act longitudinally in either direction on the stylus, an elongated swingable lever, operatively connected to said stylus, and a support for said lever.

17. In reproducing apparatus, a frame, a pantograph supported therefrom to swing laterally and provided with a copy tracing stylus movable vertically for copy depth tracing; a cutter head movable laterally over the work under the control of the pantograph and provided with a vertically floatable cutter for depth cutting in the work; and mechanism for transmitting in scaled relation said vertical movements of the stylus to said cutter to control the depth cutting vertical movements thereof, said mechanism comprising a support carried by the frame, a swingable lever, and a detachable bracket vertically movable with said cutter and provided with a member straddling and held to said lever and rotatable on a vertical axis, said lever and said member providing for relative movements longitudinally with respect to said lever.

18. A reproducing machine, including a frame; a pantograph of the jointed parallelogram type swingable from said frame in a normally fixed horizontal plane on a vertical supporting axis, said pantograph provided with a stylus universally movable laterally therewith in tracing the copy, said stylus also being relatively movable vertically in following copy depth; a vertical cutter universally movable laterally over the work by the pantograph in scaled relation to the lateral movements of said stylus, said cutter also being relatively vertically movable for reproducing in the work in scaled relation the depth of the copy traced by said stylus; and a scaling motion-transmitting cross lever extending from the stylus to the cutter and having swivel supporting connection with said frame in operative association with substantially the axial line of said pantograph axis, to control the depth cutting vertical movements of the cutter by the depth vertical movements of said stylus in scaled relation.

19. A three dimensional machine, including a frame; a pantograph hung from said frame to swing laterally; a cutter head controlled and propelled by said pantograph in its universal lateral movements over the work and provided with and carrying a cutter for lateral cutting, said cutter being also relatively movable vertically for depth cutting; said pantograph provided with a stylus universally movable laterally therewith in tracing the copy, said stylus being also relatively movable vertically in tracing copy depth; and a single scaling cross lever, mechanism operatively associated with the frame, stylus and cutter to control the said vertical movements of the cutter by said vertical movements of said stylus, said mechanism being also operatively associated with said pantograph to maintain the same reproduction ratio between the stylus and cutter for lateral and depth cutting.

20. A three dimensional machine, including a frame; a pantograph hung from said frame to swing laterally; a cutter head controlled and propelled by said pantograph in its universal lateral movements over the work and provided with and carrying a cutter for lateral cutting, said cutter being also relatively movable vertically for depth cutting; said pantograph provided with a stylus universally movable laterally therewith in tracing the copy, said stylus being also relatively movable vertically in tracing copy depth; and a single scaling cross lever operatively associated with the frame, stylus and cutter to control the said vertical movements of the cutter by said vertical movements of said stylus, said lever being also operatively associated with said pantograph to maintain substantially the same reproduction ratio between the stylus and cutter for lateral and depth cutting, said pantograph being adapted for hand operation in causing the stylus to trace the copy and the cutter to correspondingly move over the work, said pantograph being adjustable to similarly vary the reproducing ratio between the universal lateral movements of the stylus and cutter and the vertical depth movements of the stylus and cutter.

21. A three dimensional engraving machine, embodying a main support providing a normally-fixedly-located pantograph supporting axis; a pantograph of pivotally united links hung from and bodily swingable laterally on said axis in a normally-fixed plane perpendicular thereto; said pantograph provided with a stylus and a cutter spindle controlled in their lateral movements over the copy and the work, respectively, by said pantograph, said spindle and stylus being relatively movable on lines parallel with said axis for depth cutting and tracing; said pantograph maintaining the scaled relation of the stylus and spindle with said axis during a reproducing operation; and mechanism operatively associated with the stylus, spindle, pantograph and support for controlling the depth cutting movements of said spindle by the depth tracing movements of said stylus, including a lever swingable laterally with said pantograph on the axial line of said axis, and also swingable on an axial line perpendicular to and intersecting the axial line of said pantograph axis; said pantograph being adjustable to change and set the scaling relation between the spindle and stylus and said pantograph axis, and between said axes on which said lever is swingable, and the spindle and stylus.

22. A three dimensional engraving machine, including a support providing a normally fixedly-located vertical axis; a pantograph of pivotally united links supported from and bodily swingable laterally on said axis in a normally fixed plane perpendicular thereto, said pantograph provided with a cutter spindle and a stylus controlled thereby in their set scaled relation with respect to said axis during their universal lateral movements over the work and copy, said spindle and stylus being movable relatively to the pantograph along lines perpendicular to said plane for depth cutting and tracing; lever means for controlling said depth cutting movements of the spindle by said depth tracing movements of said stylus; means confining said lever means to lateral swing with said pantograph on the axial line of said pantograph axis; and means confining said lever means to also swing on an axial line intersecting and perpendicular to said axial line of the pantograph axis under the controlling depth tracing movements of the stylus.

23. A three dimensional engraving machine, including a support providing a normally fixedly-located vertical axis; a pantograph of pivotally united links supported from and bodily swingable laterally on said axis in a normally fixed plane perpendicular thereto, said pantograph provided with a cutter spindle and a stylus controlled thereby in their set scaled relation with respect to said axis during their universal lateral movements over the work and copy, said spindle and stylus being movable relatively to the pantograph along lines perpendicular to said plane for depth cutting and tracing; lever means for controlling said depth cutting movements of the spindle by said depth tracing movements of said stylus; means confining said lever means to lateral swing with said pantograph on the axial line of said pantograph axis; and means confining said lever means to also swing on an axial line intersecting and perpendicular to said axial line of the pantograph axis under the controlling depth tracing movement of the stylus, said pantograph being adjustable to vary and set the spacing relations between said pantograph axis and said spindle and stylus, respectively, and to automatically vary and set the spacing relations between the axes of said lever means and said spindle and stylus, respectively.

24. A three dimensional engraving machine, including a support providing a normally fixedly-located vertical axis; a pantograph of pivotally united links supported from and bodily swingable laterally on said axis in a normally fixed plane perpendicular thereto, said pantograph provided with a cutter spindle and a stylus controlled thereby in their set scaled relation with respect to said axis during their universal lateral movements over the work and copy, said spindle and stylus being movable relatively to the pantograph along lines perpendicular to said plane for depth cutting and tracing; lever means for controlling said depth cutting movements of the spindle by said depth tracing movements of said stylus; means confining said lever means to lateral swing with said pantograph on the axial line of said pantograph axis; and means confining said lever means to also swing on an axial line intersecting and perpendicular to said axial line of the pantograph axis under the controlling depth tracing movements of the stylus, said pantograph and its said spindle and stylus being operatively associated with said lever means and its said axes, to maintain the operative spacing relations between said axes of the lever means and said spindle and stylus, respectively, in operative relationship to the spacings maintained by the pantograph between said pantograph axis and said spindle and stylus, respectively.

25. A three dimensional engraving machine, embodying a support; a normally fixedly-located pantograph supporting axis; a pantograph of the parallelogram type comprising pivotally joined links, said pantograph mounted on said single axis to bodily swing laterally in a normally fixed plane perpendicular to said axis; a cutter spindle, and a stylus, carried by said pantograph in normally fixed spacing relations with respect to said axis, said spindle and stylus being movable relatively to said pantograph in lines perpendicular to said plane, for depth cutting and tracing; lever means for controlling the longitudinal movements of the spindle by the longitudinal movements of the stylus, said means including a non-telescopic lever of normally fixed length; means providing a normally fixed axis aligned with said pantograph axis on which said lever is swingable laterally; and means providing a fulcrum axis intersecting and perpendicular to the line of said pantograph axis, on which said lever is swingable in a plane perpendicular to said plane in which the pantograph is swingable, said pantograph being adjustable to change and set the reproducing ratio spacing between said pantograph axis and said spindle and stylus, respectively, and to automatically shift and set the spacing relations between said axes of the lever and said spindle and stylus, respectively.

26. A three dimensional engraving machine, including a support; pivotally united links forming a pantograph of the parallelogram type; means providing a single normally-fixedly-located supporting axis on which said pantograph is carried from said support for lateral swing in a normally-fixed plane perpendicular to said axis; a stylus movable laterally with said pantograph for lateral dimensional copy tracing; a cutter spindle movable laterally with said pantograph for lateral dimensional work cutting; said cutter spindle and stylus being operatively associated with said pantograph to normally maintain the scaled reproducing relations of said spindle and stylus with said axis and against normal relative lateral movements longitudinally of pantograph links, said pantograph being adjustable for changing and setting the reproducing relationship between said spindle and stylus and axis; said spindle and stylus being relatively longitudinally movable along lines parallel with said axis for depth cutting and tracing; and movement transmitting means associated with the stylus, spindle, support and pantograph and adjustable with said pantograph, for controlling the longitudinal movements of the cutter spindle by the longitudinal movements of the stylus, said transmitting means including a lever confined to lateral swing on the axial line of said axis and confined to swing in the plane of said spindle and stylus on a transverse axial line perpendicular to and intersecting the axial line of said first named axis.

27. A three dimensional engraving machine, including a support; pivotally united links forming a pantograph of the parallelogram type; means providing a single normally-fixedly-located supporting axis on which said pantograph is carried from said support for lateral swing in a normally-fixed plane perpendicular to said axis; a stylus movable laterally with said pantograph for lateral dimensional copy tracing; a cutter spindle movable laterally with said pantograph for lateral dimensional work cutting; said cutter spindle and stylus being operatively associated with said pantograph to normally maintain the scaled reproducing relations of said spindle and stylus with said axis and against normal relative lateral movements longitudinally of pantograph links, said pantograph being adjustable for changing and setting the reproducing relationship between said spindle and stylus and axis; said spindle and stylus being relatively longitudinally movable along lines parallel with said axis for depth cutting and tracing; and movement transmitting means associated with the stylus, spindle, support and pantograph and adjustable with said pantograph, for controlling the longitudinal movements of the cutter spindle by the longitudinal movements of the stylus, said means including a laterally and vertically swingable scaling lever extending from the stylus to the spindle and associated with said support through the medium of said pantograph axis.

28. In a three dimensional reproducing machine of the pantograph type having a laterally-swingable pantograph; a support providing the vertical pantograph axis; a cutter spindle, and a tracer movable laterally over the work and the copy under the control of the pantograph, said spindle and tracer movable longitudinally for depth dimension cutting and tracing; a single lever operatively pivotally connected with the tracer and with the cutter spindle, respectively, to control the longitudinal movements of the cutter by the longitudinal movements of the tracer; and a swivel mounting for said lever operatively coupling said lever to said support and providing a vertical axis on which said lever is swingable laterally with the pantograph on the axial line of said pantograph axis, and a transverse axis perpendicular to and intersecting said vertical axis, on which said lever is swingable vertically, said transverse axis being located substantially in a straight line that intersects the operative connections between the lever and the cutter spindle and the tracer.

29. In a three dimensional reproducing machine of the laterally swingable pantograph type, having a cutter spindle and a tracer controlled in their lateral movements over the work and copy by the pantograph, and relatively movable longitudinally with respect to the pantograph for depth cutting and tracing; a frame providing the vertical pantograph supporting axis; a lever swingable laterally with the pantograph, for controlling the longitudinal movements of said spindle by the longitudinal movements of said tracer; and a swivel mounting directly coupling said lever to said frame, including a yoke mounted to rotate about a vertical axis alined with said pantograph axis, and a bracket confined to said yoke to rotate therewith on said axis and mounted to said yoke to relatively oscillate on a transverse axis intersecting and perpendicular to said yoke axis and establishing an axis on which said lever is swingable vertically.

30. In a three dimensional engraving machine; a frame providing a vertical pantograph axis; a pantograph swingable laterally on said axis; a tracer, and a cutter spindle both universally movable laterally with the pantograph, and both relatively movable vertically for depth tracing and cutting; in combination with a scaling lever having transverse pivotal connection with the tracer and extending therefrom substantially across the parallel axial lines of the spindle and the pantograph axis; and means coupling said lever to said frame to swing laterally on the axial line of said pantograph axis, and to swing vertically on a transverse axis intersecting said axial line of the pantograph axis, said spindle and tracer being operatively associated with said lever on parallel transverse axes located substantially in a common plane with said lever transverse axis, said pantograph throughout its operative movements maintaining the relative lateral dimensional scaled spacings of the tracer, spindle and pantograph axis and the relative depth dimensional spacings of the tracer, spindle and transverse axis of said lever.

31. In a three dimensional engraving machine; a frame providing a vertical pantograph axis; a pantograph substantially of the parallelogram type embodying pivotally united arms including the tracer arm, said pantograph swingable laterally on said axis and foldable and extensible toward and from the same; a tracer mounted in said tracer arm for lateral movements therewith; and a cutter spindle movable laterally with the pantograph and mounted therein at a point remote from said tracer arm; said tracer and said spindle being movable vertically for depth tracing and cutting; in combination with a scaling lever actuated by the depth movements of the tracer and controlling the depth movements of the spindle, said lever extending transversely of at least several pantograph arms including the tracer arm; and means coupling said lever to said frame to swing laterally substantially on the axial line of said pantograph axis and to swing vertically on a transverse axis substantially intersecting said axial line; said lever being operatively connected with the spindle and the tracer on transverse axes substantially in a common plane with said transverse axis of the lever; said pantograph during its operative movements, maintaining the relative lateral dimensional scaled spacings of the tracer, spindle and pantograph axis, and the relative depth dimensional spacings of the tracer, spindle and transverse axis of the lever.

32. In a three dimensional engraving machine; a frame providing a vertical pantograph axis; a pantograph swingable laterally on said axis; a tracer, and a cutter spindle both universally movable laterally with the pantograph, and both relatively movable vertically for depth tracing and cutting; in combination with means for maintaining the depth dimensional reproducing ratio substantially identical with the lateral dimensional reproducing ratio set by the pantograph, including a scaling lever extending from the tracer across the parallel axial lines of the spindle and the pantograph axis, said lever being swingable laterally on the axial line of said pantograph axis and being swingable vertically on a transverse axis intersecting said axial line, said spindle and tracer being operatively pivotally associated with said lever on parallel transverse axes located substantially in a common plane with said lever transverse axis, said pantograph throughout its operative movements maintaining the relative lateral dimensional scaled spacings of the tracer, spindle and pantograph axis, and the relative depth dimensional spacings of the tracer, spindle and transverse axis of the lever.

33. In a three dimensional engraving machine; a frame providing a vertical pantograph axis; a pantograph substantially of the parallelogram type embodying pivotally united arms including the tracer arm, said pantograph swingable laterally on said axis and foldable and extensible toward and from the same, said pantograph being adjustable to correspondingly change and set both the lateral and depth dimensional reproducing ratio; a tracer mounted in said tracer arm for universal lateral movements therewith; and a cutter spindle universally movable laterally with the pantograph and mounted therein at a point remote from said tracer arm; said tracer and said spindle being movable vertically in said pantograph for depth tracing and cutting; in combination with means for maintaining the depth dimensional reproducing ratio substantially identical with the lateral dimensional reproducing ratio set by the pantograph and for simultaneously and correspondingly changing said depth reproducing ratio by and with the adjustment of the pantograph to change and set the lateral dimensional reproduction ratio, said means including a scaling lever actuated by the depth movements of the tracer and controlling the depth movements of the spindle, said lever extending transversely of at least several pantograph arms including the tracer arm, said lever confined to swing laterally on the axial line of said pantograph axis and to swing vertically on a transverse axis intersecting said axial line, and being operatively associated with said spindle, said tracer and said frame to provide for relative movements toward and from said axial line of the pantograph axis and longitudinally with respect to said lever between said tracer, spindle and lever; said pantograph during its operative movements, maintaining the relative lateral dimensional scaled spacings of the tracer, spindle and pantograph axis, and the relative depth dimensional spacings of the tracer, spindle and transverse axis of the lever.

34. In a three dimensional engraving machine; a frame providing a vertical pantograph axis; a pantograph swingable laterally on said axis; a tracer, and a cutter spindle both universally movable laterally with the pantograph, and both relatively movable vertically for depth tracing and cutting; in combination with a scaling lever having transverse pivotal connection with the tracer and extending therefrom substantially across the pantograph axis; and means coupling said lever to said frame to swing laterally substantially on the axial line of said pantograph axis, and to swing vertically on a transverse axis substantially intersecting said axial line of the pantograph axis, said spindle and tracer being operatively associated with said lever on transverse axes located substantially in a common plane with said lever transverse axis.

35. A three dimensional machine, including a frame; a pantograph hung from said frame to swing laterally; a cutter head controlled and propelled by said pantograph in its universal lateral movements over the work and provided with and carrying a cutter for lateral cutting, said cutter being also relatively movable vertically for depth cutting; said pantograph provided with a stylus universally movable laterally therewith in tracing the copy, said stylus being also relatively movable vertically in tracing copy depth; and mechanism including a scaling lever swingable laterally with the pantograph on a common vertical supporting axis, and operatively associated with the stylus and cutter to control the said vertical movements of the cutter by said vertical movements of said stylus, said lever being also operatively associated with said pantograph and its axis to maintain substantially the same reproduction ratio between the stylus and cutter for lateral and depth cutting.

PETER M. HENKES.